United States Patent [19]
Jacoby et al.

[11] 3,804,685
[45] Apr. 16, 1974

[54] VINYL REPAIR PROCESS

[75] Inventors: Henry C. Jacoby; Abraham Jacoby; David Jacoby, all of Los Angeles, Calif.

[73] Assignee: Specialty Coatings & Chemicals, Inc., North Hollywood, Calif.

[22] Filed: June 14, 1972

[21] Appl. No.: 262,601

[52] U.S. Cl......................... 156/98, 117/2 R, 264/36
[51] Int. Cl.............................................. B32b 35/00
[58] Field of Search ............ 156/94, 98; 117/2 R, 4; 264/36

[56] References Cited
UNITED STATES PATENTS
3,265,515   8/1966   Wilhelmsen........................ 117/2 R
3,620,865   11/1971   Golumbie ............................. 156/98

*Primary Examiner*—Edward G. Whitby
*Attorney, Agent, or Firm*—Allan M. Shapiro

[57] ABSTRACT

Process for repairing holes or cuts in vinyl upholstery includes adhesive securement of a vinyl under-patch below the hole and filling the hole with a solution of vinyl in solvent, it being critical that some of the vinyl dissolved in the solvent is of the same color material as the vinyl being repaired.

6 Claims, 7 Drawing Figures

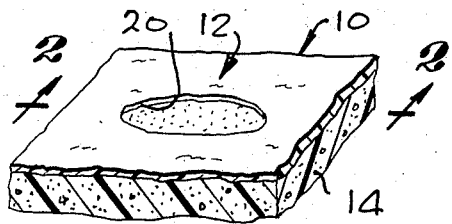
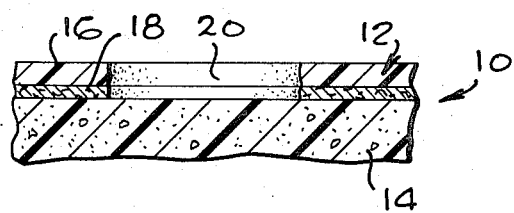
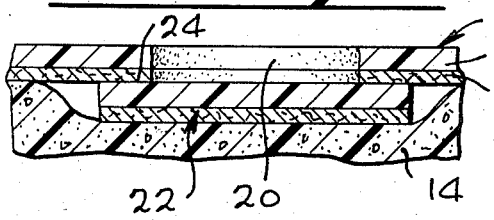
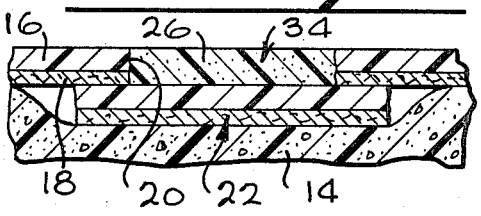
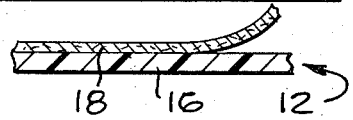
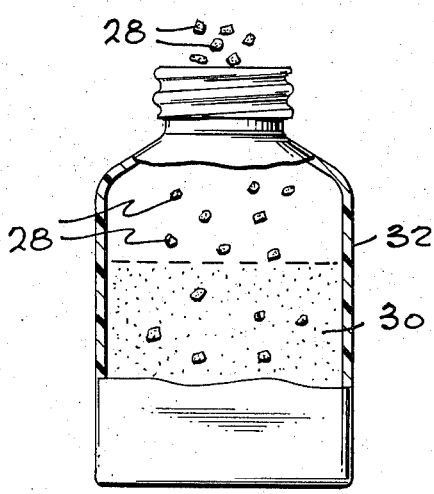
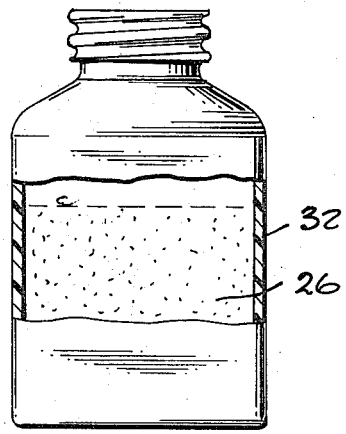

VINYL REPAIR PROCESS

BACKGROUND OF THE INVENTION

1. Field of the Invention

This invention is directed to a vinyl repair process which includes preparation of a colored vinyl in liquid solution for placement in openings in vinyl upholstery fabric for the repair thereof.

2. Description of the Prior Art

Upholstered articles are used by the public for many purposes. In the household, much furniture is covered with vinyl. Modern vinyl upholstery materials are often a vinyl layer on a fabric backing and are useful because of their convenient workability. Modern vinyl can be made to closely approximate leather as an upholstery material but, beyond that, it is superior to leather in many ways and can be used to create upholstery results which are different from those available from leather. Vinyl is flexible and has a good feeling to the hand. It is of long life and maintains its excellent appearance quality even under extensive and heavy usage.

Thus, vinyl, usually on a fabric backing, is used for household upholstery of chairs and couches, as well as for the appearance upholstery of some furniture such as endtabletops and beadsteads. Outside of the household, vinyl is extensively used as an upholstery material in commercial applications. It is necessary to a restaurant operation to have furniture which is most attractive to encourage repeat customers. Vinyl is a suitable upholstery material because it is easy to maintain, even with continued heavy usage, and is easy to keep clean. Thus, restaurant seats are often upholstered with vinyl materials. Similarly, most modern automobile seats are upholstered in vinyl because of the advantageous properties described.

Of course, such vinyl upholstery fabrics are not indestructible, and thus are damaged from time-to-time. The damage might be a cut caused by a sharp instrument coming into contact with the upholstery fabric. It might be a burn caused by a dropped cigarette or other small, burning object. On the other hand, the upholstery fabric might be torn, or pulled apart along a seam. In order to prevent the need for complete reupholstery, it is desirable to repair such damages to vinyl upholstery fabric. The most common repair for such holes is to simply place a patch thereover, the patch preferably being of the same color and material as the upholstery fabric, and to glue the patch in place. Of course, this is a fairly obvious repair. A better repair is achieved when a patch is cemented below the hole to be repaired, and the hole is filled with a material to level off the hole. However, color-matching to the surrounding material is a real problem in such repairs.

SUMMARY OF THE INVENTION

In order to aid in the understanding of this invention, it can be stated in essentially summary form that it is directed to a vinyl repair process. The process includes the steps of placement of a vinyl patch layer below the opening to be repaired and filling the opening with a solution of vinyl in solvent which includes vinyl of the same color as the material being patched.

It is, accordingly, an object of this invention to provide a vinyl repair process which is easy to use and results in a vinyl patch which is virtually undetectable. It is another object to provide a vinyl patch process which includes the step of placing into solution a portion of the vinyl fabric which is to be repaired so that the vinyl in solvent which is used for the repair has the same color as the vinyl fabric being repaired. It is yet another object to provide a vinyl repair process which is economic so that it can be widely employed, but yet provide a patch which is virtually undetectable. It is another object to provide a vinyl repair process by which a patch is formed which is virtually of the same material as the original vinyl upholstery fabric and, thus, is flexible with the fabric which has been repaired.

Still other objects, features, and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a perspective view of a portion of an upholstered article, with parts broken away, to show only the upper portion of the upholstery layers and illustrating a hole to be repaired in the upholstery fabric.

FIG. 2 is a sectional view thereof, taken generally along line 2—2 of FIG. 1, showing in more detail the vinyl upholstery fabric and a portion of the underlying upholstery material, such as resilient foam material.

FIG. 3 is similar to FIG. 2, and further showing the under-patch layer placed beneath the hole to be repaired.

FIG. 4 is similar to FIG. 3, and further showing the hole filled with vinyl which has been placed in position while in liquid solution.

FIG. 5 shows the backing being removed from a piece of vinyl upholstery material.

FIG. 6 shows small pieces of vinyl from the upholstery fabric being placed into a first solution for dissolving.

FIG. 7 shows the colored second solution ready for placement into the hole illustrated in FIG. 3 to result in the filled hole of FIG. 4.

DESCRIPTION OF THE PREFERRED EMBODIMENTS

FIGS. 1 through 4 illustrate an upholstered structure 10. The upholstered structure 10 has a vinyl upholstery fabric 12 and a conventional upholstery cushion 14. The upholstery cushion 14 can be upholstery padding, such as cotton pad, kapok pad, or other felt or hair padding but, in modern upholstery, the upholstery cushion 14 is usually the resilient polymer composition foam especially formed for the required resiliency. Polyurethane foam is one specific variety which is presently commonly used.

Vinyl upholstery fabric 12 is made up of a vinyl layer 16 on a backing 18. The backing layer 18 is conventionally textile fabric, either woven or knitted, to provide stability in the sheetwise direction. Instead of employing a textile backing layer 18, in some cases a backing layer of polymer composition material can be used. This includes sheet material as well as a fairly thin layer of fairly rigid foamed polymer composition material. The vinyl layer 16 is a conventional commercial vinyl, and is usually predominantly a polyvinyl chloride material. However, other copolymers, plasticizers, pigments and the like are usually employed in small quantities to provide specific characteristics. The amount of pigmentation and the kind of material used for pigmentation of the vinyl polymer is a function of the desired end result.

A first or primary solution is employed in this vinyl repair process. The primary solution comprises polyvinyl chloride resins dissolved in a mixture of solvents, the mixture of solvents comprising ketone solvents and tetrahydrafuran or similar solvents. The employment of a fortifier type of solvent, of which tetrahydrafuran is an example, is critical. The polyvinyl chloride resins in the primary solution are preferably clear so that the solution is clear.

The process also employs a second or secondary solution. This second solution is made by dissolving colored vinyl into the first solution. The colored vinyl is preferably the same upholstery vinyl as is used on the upholstered article. This colored vinyl can be saved from the original upholstery, can be obtained by cutting it from a hidden, unfinished edge of the upholstered structure, or can be obtained from a present upholstery operation. The backing is removed from the colored vinyl. The colored vinyl is preferably cut into small bits or pieces and then is placed into the primary solution. Sufficient colored vinyl is added to the primary solution to make up a secondary solution which is 10 to 30 percent by weight polyvinyl chloride, with the preferred value being 15 percent by weight polyvinyl chloride. The second solution is stirred until the colored vinyl all goes into solution, and the second solution is permitted to let stand for a period before use to permit undissolvable residue to gravitationally separate. Thereupon, the second solution is ready for use.

Referring to FIG. 6, the first solution 30 is in bottle 32. It is converted to the second solution 26, shown in FIG. 7, by the addition of bits 28 of the vinyl 16. FIG. 5 illustrates the separation of the backing from the vinyl layer so that the layer 16 can be cut into bits 28 and added to the first solution to make the second solution.

The upholstered structure 10 has a hole 20 therein which is to be repaired by the vinyl repair process of this invention. As the first step of this process, an underpatch 22 is inserted in the upholstered structure beneath vinyl upholstery fabric 12 and on top of upholstery cushion 14. Underpatch 22 is preferably of the same material as vinyl upholstery fabric 12 and can be obtained by cutting it from a hidden, unfinished edge of the upholstered structure. Often, on the bottom of a chair or the like, there is an opportunity to remove a small portion of an excess edge. If such is not available from the underside of the furniture, a leftover scrap piece can be retained from the original upholstering operation, or an identical or similar piece can be obtained from a present upholstering operation. The underpatch 22 is inserted into place, as shown in FIG. 3, and the first solution or the second solution is applied around the hole 20 on the underside of upholstery fabric 12 to adhesively secure joint 24 between the underpatch and the upholstery fabric.

The second solution 26 is placed in the hole 20 to provide patch 34, see FIG. 4. While patch 34 is shown as having finely defined edges, this is simply for drawing convenience, because the solvent in the second solution 26 solvent-welds the vinyl in solution to the adjacent vinyl, both at the top upholstery fabric layer 12 and the underpatch 22. Thus, the edges illustrated in FIG. 4 are integrally joined together. Second solution 26 is placed in the hole 20 to form patch 34, and with the evaporation of the solvent in second solution 26, the application is repeated several times until the surface is level. This is the completion of the process.

While particular embodiments of the present invention have been shown and described, those skilled in the art will find that changes and modifications may be made without departing from the spirit of this invention and, therefore, the aim in the appended claims is to cover all such changes and modifications as fall within the true spirit and scope of this invention.

What is claimed is:

1. The process of repairing
    a structure upholstered with vinyl upholstery fabric having an opening to be repaired in the vinyl upholstery fabric, comprising the steps of:
    preparing a pigmented vinyl solution by the steps of forming a first solution of polyvinyl chloride resin in ketone and tetrahydrafuran, and
    placing vinyl material pigmented to color-match the vinyl upholstery fabric into the first solution and dissolving it therein to form said pigmented vinyl solution; and
    positioning the pigmented vinyl solution into the opening in the vinyl upholstery fabric and permitting the solvent to evaporate so that pigmented vinyl from the solution bridges the opening after solvent escape.

2. The process of claim 1 further including:
    the preliminary step of placing an underpatch under the opening in the vinyl upholstery fabric to close the bottom of the opening and adjoining opposite edges of the opening, preliminarily to placing the pigmented second vinyl solution in the opening so that, when the pigmented second vinyl solution is placed in the opening, it contacts the edges of the opening and the underpatch.

3. The process of claim 2 further including:
    the step of removing a portion of the original vinyl upholstery fabric on the upholstered structure and employing the vinyl portion of the removed upholstery fabric as pigmented vinyl for producing the second vinyl solution.

4. The process of claim 2 further including:
    the step of removing a portion of the vinyl upholstery fabric on the upholstered structure and employing the portion of vinyl upholstery fabric as underpatch.

5. The process of claim 4 further including:
    the step of removing a portion of the original vinyl upholstery fabric on the upholstered structure and employing the vinyl portion of the removed upholstery fabric as pigmented vinyl for producing the second vinyl solution.

6. The process of claim 5 wherein
    the dissolving step comprises dissolving sufficient vinyl in the first solution so that the second solution employed to fill the opening in the vinyl upholstery fabric is 15 to 30 percent by weight vinyl.

* * * * *